A. PFEIFFER.
LISTER PLOW.
APPLICATION FILED JUNE 20, 1921.

1,438,398.

Patented Dec. 12, 1922.

Inventor:
A. Pfeiffer
By Munn & Co.
Attys

Patented Dec. 12, 1922.

1,438,398

UNITED STATES PATENT OFFICE.

ADAM PFEIFFER, OF KINGSVILLE, TEXAS.

LISTER PLOW.

Application filed June 20, 1921. Serial No. 478,855.

*To all whom it may concern:*

Be it known that I, ADAM PFEIFFER, a citizen of the United States, and a resident of Kingsville, in the county of Kleberg and State of Texas, have invented a new and useful Improvement in Lister Plows, of which the following is a full, clear, and exact description.

My invention relates to improvements in plows, and more particularly to that type known as lister plows, and it consists in the combinations, constructions and arrangements herein described and claimed.

A lister plow differs from the more common form of plow; namely, the breaker or brush plow, in that the lister plow has two surfaces, one on each side of the beam for shedding and throwing aside the soil. It is used to break or bed up land and to plow furrows for the planting of crops.

The type of lister plow in use at this time has certain disadvantages which I have overcome in my present invention in addition to providing other important improvements.

In the operation of the lister plow, a furrow is run every 32 or 36 inches, the soil being shed in ridges on each side of the furrow. This is called bedding up. At planting time the lister is run in the ridges, throwing the soil back into the furrows and leaving a new furrow in which to plant. In going over the land a second time with the present type of lister, a strip of unworked soil is left on each side of the furrow.

One of the objects of my present invention is to provide means for working all of the land, doing away with these hard strips and thus enabling the land to hold that much additional moisture.

Another object of my invention is to provide means for allowing some of the broken earth to fall back into the furrow and thus cover practically all of the land with loose soil, which is very desirable, since the loose earth serves to hold moisture and keeps the soil in good shape for planting.

Another object is to provide a lister plow that will shed the soil readily. In black sticky land a great deal of trouble is had from this source with the present type of lister which has stationary mold boards in place of the disc construction as used in my present invention.

A further object is to provide a lister plow that will pull through the ground easier than the present type in use.

I attain these and other objects by the mechanism illustrated in the accompanying drawing, in which.

Referring now to the drawings in detail, in which similar numerals refer to similar parts in both views.

Figure 2:
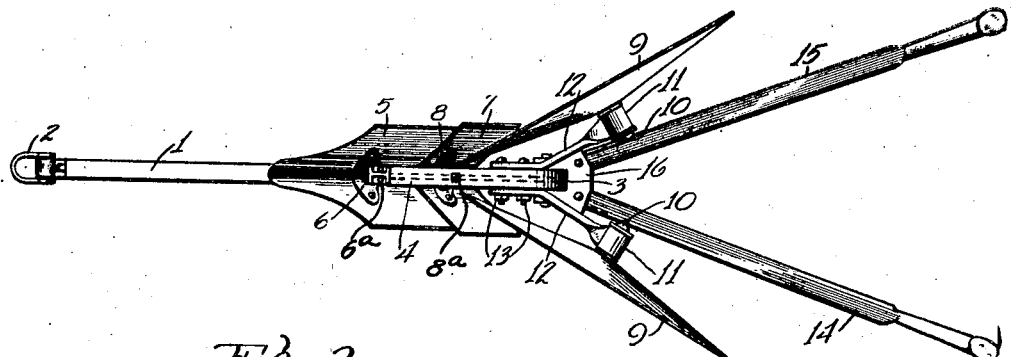
Figure 2 is a full bottom view, showing means for fastening the discs to the beam.
Figure 1:
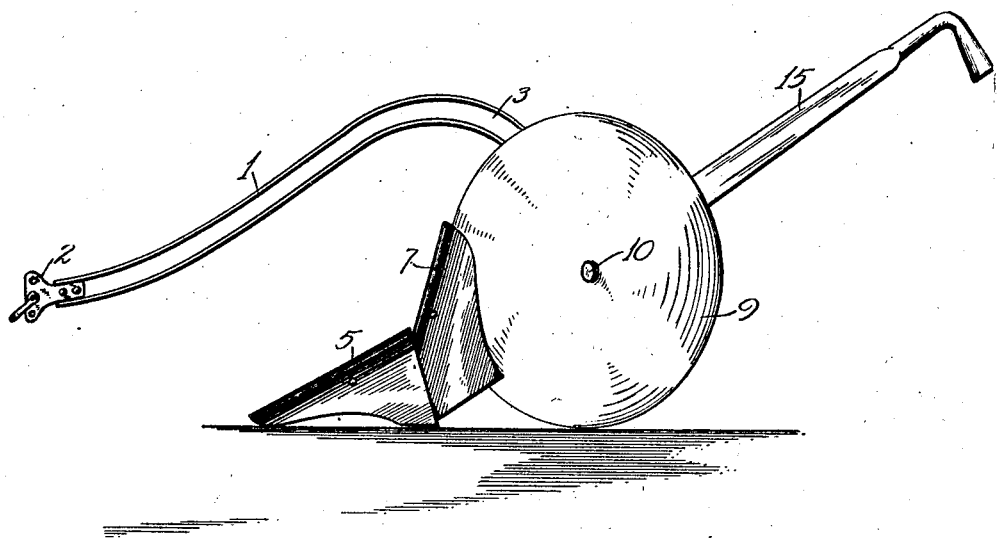
Figure 1 is a full side view of the disc lister plow.

A steel beam 1 at one end of which is riveted the clevis 2 is arched at 3 and turned back at 4 to provide means of support for the several parts of the implement.

The plow share 5 is solidly fixed to the beam 1 by means of a frog 6 which in turn is riveted to the portion 4 of the beam as shown at $6^a$. The disk shield 7 is mounted on the beam 1 by means of the frog 8, but instead of riveting this frog to the beam, as in the case of the plow share 5, it is bolted so that the disk shield may be entirely removed from the plow as shown at $8^a$.

The disks 9 are of steel and slightly concave. They are arranged so as to rotate on the axis 10 in the bearings 11. These bearings are formed by rolling the ends of the straps 12 to form cylinders which in turn wrap and hold suitable metal bearings. The straps 12 are of steel and are securely held to the beam 1 by beams or bolts 13. The position of the disks 9 with respect to the beam 1 is substantially shown in Figure 2.

Wooden handles 14 and 15 are also fixed to the beam 1 by means of a cast piece 16 which is bolted directly to the beam by bolts as shown at 17.

In operation, my disk lister plow is pulled through the soil in the same manner as any ordinary lister plow, but with far greater ease as the disks revolve, due to their friction with the soil and shed the earth with more of a lifting action than the much harder pushing aside of the soil as done by the stationary mold board used heretofore on lister plows. Because of this ease of pulling through the ground, it has been possible to increase the area of this shedding surface, which at the same time makes it possible to move a broader tract of earth, thus doing away with the unworked strip of land aforementioned. The lister is usually pulled by horses, but is just as readily adapted to the tractor. In breaking the land, especially in dry country, the disk shield is removed allowing some of the soil to drop between the disks and back into the furrow.

Realizing that my invention may be changed in its physical embodiment without departing from the scope of my invention, I desire it to be understood that the specific form and construction herein shown is to be taken as illustrative and not in a limited sense.

I claim:

1. A lister plow comprising a beam, a plow share secured to the beam, a shield removably supported on said beam immediately in the rear of said plow share, said plow share arranged to overlap said shield, and a pair of rotatably mounted concave disks disposed in the rear of and partially covered by said shield, said disks arranged to incline away from one another at the rear of said plow.

2. A lister plow comprising a beam, a plow share secured to said beam, a shield disposed immediately in the rear of said plow share, said plow share arranged to overlap said shield, and a pair of rotatable disks carried by the beam in the rear of the shield, said disks being inclined toward one another.

3. A lister plow comprising a beam, a plow share secured to said beam, a V-shaped shield secured to the beam in the rear of the plow share, said plow share arranged to overlap said shield, a pair of rotatable disks carried by said beam on each side thereof, each of said disks being concave on its outer side, said disks being angularly disposed with respect to one another and the front edges of the disks being covered by said shield.

ADAM PFEIFFER.